United States Patent
Siimes et al.

(10) Patent No.: US 6,981,612 B2
(45) Date of Patent: Jan. 3, 2006

(54) TAMPER-PROOF GAS PIN VALVE

(75) Inventors: Thomas S. Siimes, Windsor (CA); Timo Siimes, Windor (CA)

(73) Assignee: Gas Cylinder Technologies, Lake Shore (CA)

( * ) Notice: Subject to any disclaimer, the term of this patent is extended or adjusted under 35 U.S.C. 154(b) by 73 days.

(21) Appl. No.: 10/741,943

(22) Filed: Dec. 19, 2003

(65) Prior Publication Data

US 2004/0183043 A1 Sep. 23, 2004

Related U.S. Application Data

(60) Provisional application No. 60/435,210, filed on Dec. 19, 2002.

(51) Int. Cl.
*F16K 1/00* (2006.01)

(52) U.S. Cl. ........................ 222/3; 251/144; 251/149.6; 251/149.7

(58) Field of Classification Search ................ 251/144, 251/149, 149.1, 149.4–149.8; 222/3, 4
See application file for complete search history.

(56) References Cited

U.S. PATENT DOCUMENTS

| 4,545,405 A | * | 10/1985 | LaBelle | 137/524 |
| 4,879,978 A | * | 11/1989 | Pierce | 123/90.67 |
| 5,832,965 A | * | 11/1998 | Fasse et al. | 141/20 |
| 5,975,489 A | * | 11/1999 | deCler et al. | 251/149.1 |
| 2003/0062498 A1 | * | 4/2003 | DeClar et al. | 251/149.6 |

* cited by examiner

*Primary Examiner*—J. Casimer Jacyna
(74) *Attorney, Agent, or Firm*—Carlson, Gaskey & Olds

(57) ABSTRACT

A pin valve assembly includes a spring biasing a piston against a seal to seal an opening of a gas cylinder. The spring compresses a length determined by a distance between the insert and the plunger. The insert is pressed into an opening opposite the plunger and held in place by at least one barb extending inward from an inner diameter of a body of the insert. The insert includes an opening to allow communication of gas pressure to a rear portion of the piston. The inner diameter of the pin valve assembly includes at least one barb to secure and prevent removal of the insert.

18 Claims, 3 Drawing Sheets

TAMPER-PROOF GAS PIN VALVE

This application claims priority to U.S. provisional application Ser. No. 60/435,210 filed Dec. 19, 2002.

BACKGROUND OF THE INVENTION

This application relates to a gas pin valve for a gas cylinder and specifically to a gas pin valve for a gas cylinder including tamper resistance and tamper evident features.

Typically, a gas cylinder is filled with a liquid or gas under a desired pressure. The gas cylinder is designed to withstand specific pressures and to deliver the gas and liquid at pressure to specific devices. Commonly, devices such as paintball guns or fire extinguishers use the pressurized gas within the cylinder to propel a paintball in the case of the paintball gun, or a fire suppression chemical in the case of a fire extinguisher. In any device, it is desired to maintain the gas or liquid within the cylinder at a given pressure until use. It is known to use a pin-type valve threaded into the outlet of the gas cylinder to control the outlet of gas pressure from the cylinder.

Typically, a pin valve includes a piston held against a seal by a spring. The spring is trapped between the piston and a threaded screw and provides a sufficient force within the gas cylinder to prevent unwanted expulsion of gas from the gas cylinder. Typically, gas pressure within the cylinder acts in concert with the spring to bias the piston against the seal. Gas is only expelled from the gas cylinder by overcoming the force of the spring and pressure exerted by gas within the cylinder.

The pin valve is threaded into the outlet of the gas cylinder and includes a threaded member having an inlet hole. When it is desired to release pressure from the cylinder, a pin extending from the piston through the opening is pushed downward. By pushing downward on the pin, the piston is lifted off the seal and gas pressure is allowed to escape through the inlet. The pin portion of the piston extends through the opening and is of a diameter smaller than the opening to allow gas pressure to be released from the gas cylinder.

As is appreciated, the spring force exerted by the spring onto the piston contributes a substantial portion of the biasing force used to maintain gas within the cylinder. The spring force exerted against the piston is determined by a distance between a rear end of the piston and a threaded member threaded into the body of the pin valve. Currently, the threaded member is machined with outer threads that are mated to internal threads that are fabricated within the body of the pin valve. The threaded member is then machined with an allen-type tool interface for assembly within the pin valve body against the force of the spring. As appreciated, machining of internal and external threads require expensive and time consuming machining operations. Further, such pin valves are commonly assembled to gas cylinders used in recreational devices where cost is a great factor determining commercial success. As appreciated, it is always desirable to decrease the cost of producing consumer goods.

Further, in some applications it is desirable to inhibit or evidence tampering of preset conditions. As appreciated, the preset spring force of the pin valve determines the amount of and point at which gas is exhausted from the gas cylinder. In some instances, tampering with this pin valve and the point and pressure required to release gas from within the gas cylinder can cause harm or injury. In such instances, it is desirable to evidence tampering by an operator in order to limit liability. Further, it is also desirable to prevent tampering by designing a mechanism that is destroyed upon modification and rendered unusable.

Accordingly, it is desirable to develop and design a pin valve that reduces production costs while also preventing and evidencing tampering.

SUMMARY OF THE INVENTION

An embodiment of this invention is a pin valve assembly including a plastic insert for holding a piston spring and piston against a seal.

A pin valve assembly includes a spring biasing a piston against a seal to seal a gas cylinder. The spring compresses a length determined by a distance between the insert and the plunger. The insert is pressed into an opening opposite the plunger and held in place by at least one barb extending inward from an inner diameter of a body of the insert.

The insert includes an opening to allow communication of gas pressure to a rear portion of the piston. The insert includes an outer diameter sized to correspond with an inner diameter of the body of the pin valve assembly. The inner diameter of the pin valve assembly includes at least one barb disposed to secure and prevent and evidence removal of the insert. The inset is pushed and pressed in opposite the piston to compress the spring and hold the piston against a seal. The insert is held in place by one or a series of barbs machined within the inner diameter of the pin valve body.

Accordingly, the pin valve assembly of this invention prevents and evidences tampering while reducing manufacturing costs.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
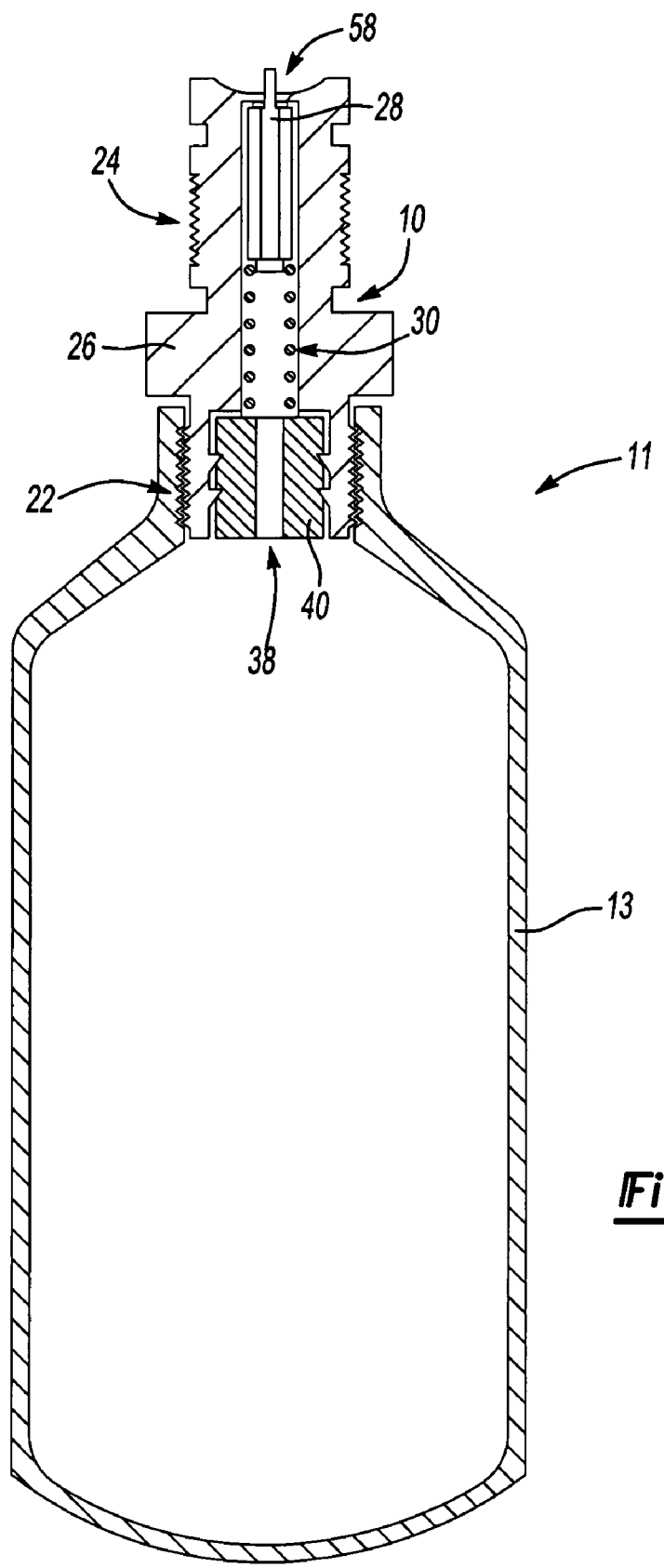
FIG. 1 is a cross-sectional view of a gas cylinder and valve assembly according to this invention.

Referring to FIG. 1, a gas cylinder assembly 11 is shown in cross section and includes a cylinder 13 and a pin valve assembly 10. The pin valve assembly 10 is received within a threaded interface with the cylinder 13. The pin valve assembly 10 includes a piston 28 with a pin portion 58 extending from an opening. The piston 28 is movable within the valve assembly 10 to control the flow of gas from the cylinder 13.

Figure 2:
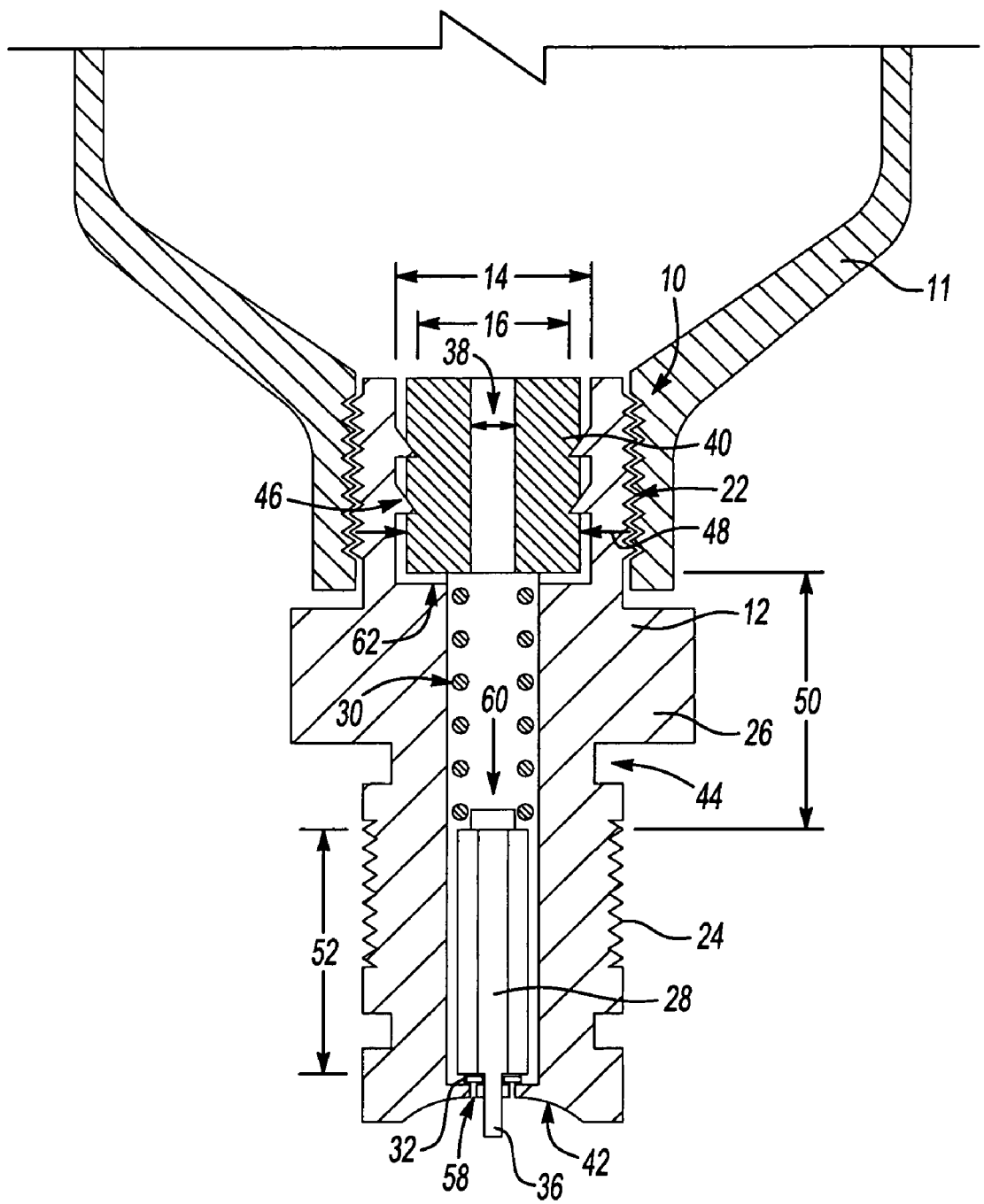
FIG. 2 is a cross-sectional view of the pin valve assembly of this invention.

Referring to FIG. 2, the pin valve assembly 10 includes a body 12 that defines a first bore 14 and a second bore 16. The outer features of the body 12 include a first threaded section 22 and a second threaded section 24. Each of the sections are designed to accommodate either the specific gas cylinder or the specific device to which this pin valve 10 is attached. Preferably, the threads 22 are adapted and configured for mating to a gas cylinder (not shown). The threads 24 are adapted and configured to mate to the device to which the gas pressure held within the gas cylinder (not shown) is used. The body portion 12 also includes a hex nut portion 26.

The hex nut portion 26 is adaptable for use by a tool to tighten and affix the pin valve assembly 10 either to the gas cylinder or to a device using the pressure within the gas cylinder. Further, other features on the body 12 include an o-ring land 44 adapted to fit a specific o-ring that would seal the device against the pin valve 10. As appreciated, the external feature of the pin valve 10 can be of any type adapted for fitting to either the gas cylinder or the device using pressure within the gas cylinder. Note that it is within the contemplation of this invention that the external features of the pin valve 10 may be of any type and configuration known to one skilled in the art adapted to fit to either a gas cylinder or a device using pressure within the gas cylinder.

The piston 28 is of a length 52 that corresponds with a spring 30 and the insert 40. The piston 28 includes a pin section 36. The pin section 36 extends through an opening 58 in the body 12. In this embodiment, the body 12 includes a concave portion 42 disposed in the opening area 58. The concave portion 42 cooperates with the device using the pressure within the gas cylinder. The piston 28 is forced downward against a seal 32. The seal 32 prevents the escape of gas pressure. The piston 28 is held against the seal 32 in part by the spring 30. The piston 28 is also held against the seal 32 by gas pressure indicated by arrows 60 exerted on a rear portion of the piston 28.

Threading a device onto the pin valve assembly 10 causes the pin portion 36 to engage a feature of the device that will push the piston 28 upward off of the seal 32 against the force of the gas pressure indicated at 60 and force of the spring 30. This action opens gas pressure to be released into the device using pressure stored within the gas cylinder 13.

The length between the upper portion of the piston 28 and the bottom portion of the insert indicated at 50 sets the amount of spring force exerted on the piston 28 against the seal 32.

Holding the spring 30 downward against the piston 28 is the insert 40. The insert 40 is pressed within an inner diameter 14 of the body 12. Disposed on the inner diameter 14 of the body 12 are barbs 46. At least one barb 46 disposed within this diameter to prevent and hold the insert 40 within the body 12.

The insert 40 also includes an opening or inner diameter 38 to which gas pressure is communicated to a rear portion of the piston 28. As appreciated, the insert 40 is held in place by the barbs 46 and does not require a plurality of threads either disposed on the exterior of the insert or interior of the insert. The insert 40 is simply pressed to a stop. The stop is a shoulder 62 that is disposed between inner diameters 14 and 16.

Figure 3:
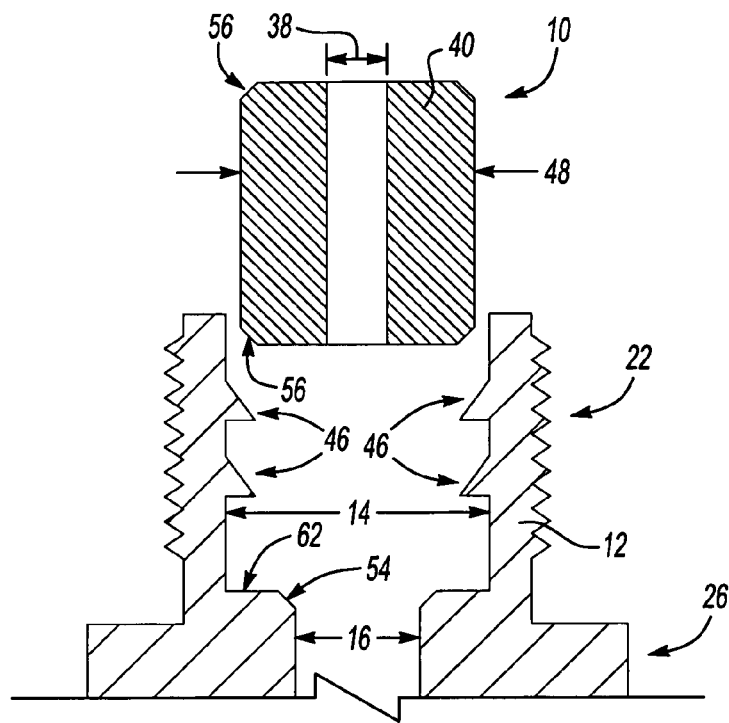
FIG. 3 is an enlarged cross-sectional view of the pin valve assembly and delron insert.

Referring to FIG. 3, the body 12 is shown in an enlarged view highlighting the diameter 14 into which the insert 40 is pressed. The insert 40 includes an outer diameter 48 that corresponds to the inner diameter 14 of the body 12. The inner diameter 14 includes at least two barbs 46. As appreciated, two barbs 46 are used, however, it is within the contemplation of this invention that only one barb may be used, or several barbs may be used as is required by the specific application and configuration. A worker skilled in the art would understand that the number of barbs is determinative only in regard to the specific application and that several barbs may be required in order to prevent removal of the insert 40. However, in some applications only one barb 46 may be required to prevent and evidence removal of the insert 40.

The insert 40 is preferably fabricated from a plastic material. Delron is preferred because it has specific properties that prevent the plastic deformation or creep over time. Other materials that exhibit similar characteristics may also be used for fabrication of the insert such as plastic material. The insert 40 includes chamfers 56 on each side to allow the inserts to be fully seated on the shoulder 60. Preferably, similar chamfers 56 are disposed on each end of the insert 40 to allow for assembly of the insert 40 in any direction. The inner diameter 38 of the insert 40 is sized to correspond to the desired amount of gas pressure exerted on the back of the piston 28. The inner diameter of the body 12,16 corresponds with the piston 28 and pressure exerted by gas within the gas cylinder as indicated by 60.

In operation, the delron insert 40 is machined to the proper dimensions with a desired outer diameter 48 that corresponds to the inner diameter 14. The insert 40 is then pressed within the body 12 to the stops 62. The insert is pressed into the pin valve 12 after the seal 32; piston 28 and spring 30 have been installed within the insert body 12. Pressing of the insert 40 into the inner diameter 14 engages the barbs 46 with the insert 40. The barbs 46 are positioned and configured such that as the insert 40 is pushed within the diameter 14, rearward movement or movement to remove the insert 40 is substantially prevented and not possible without completely destroying the insert 40.

Figure 4:
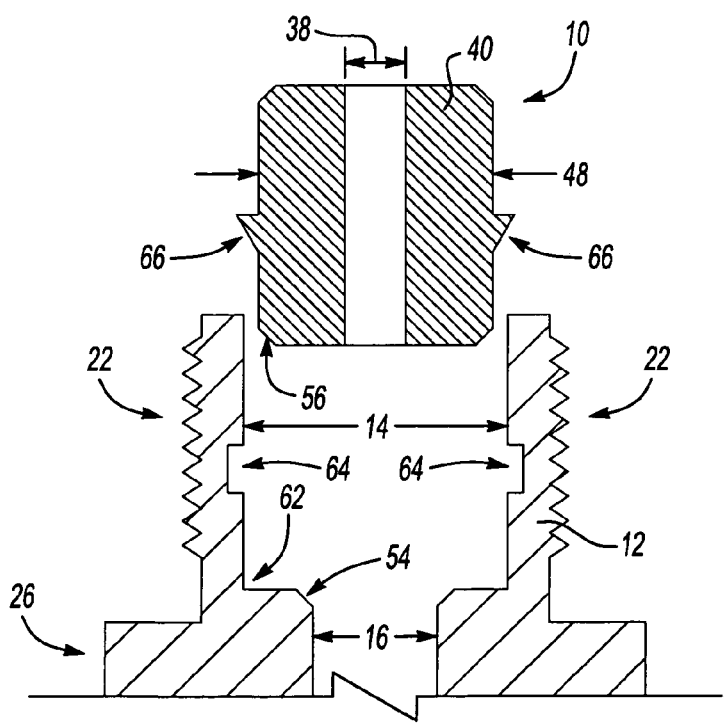
FIG. 4 is another embodiment of the pin valve assembly.

Referring to FIG. 4, another embodiment of this invention is illustrated where the barbs 66 are disposed on the insert 40. In this embodiment, the barbs 66 correspond with undercuts 64 within the inner diameter 14 of the body 12. The insert 40 is pressed within the body 12 and the inner diameter 14 where the barbs 66 engage the undercut 64 to prevent removal of the insert 40. An undercut 64 is all that is required on the inner diameter 14 of the body 12 and the barbs 66 are machined on the outer diameter 48 of the insert 40. This embodiment, however, does require that the insert 40 be inserted into the inner diameter 14 in a specific direction in order for the barbs 66 to properly engage and prevent removal of the insert 40.

As appreciated, many different configurations of barbs and undercuts are within the contemplation of this invention and a worker skilled in the art would understand that the specific configuration of the barbs relative to the body and insert are application specific and are within the scope of this invention.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention.

What is claimed is:

1. A valve assembly comprising:
   a housing defining a first bore comprising an inlet and an outlet;
   a piston movable within said bore between an open and closed position, wherein said piston comprises a pin section extending through said outlet;
   a spring biasing said piston toward said closed position; and an insert securable within said first bore by at least one barb, said spring disposed between said piston and said insert.

2. The assembly as recited in claim 1, wherein said at least one barb is disposed on an internal surface of said bore.

3. The assembly as recited in claim 1, comprising a groove within said bore and said insert includes said at least one barb, wherein said at least one barb engages said groove.

4. The assembly as recited in claim 1, comprising a shoulder for controlling assembly of said insert into said first bore.

5. The assembly as recited in claim 1, wherein a distance between said piston and said insert compresses said spring a desired amount.

6. The assembly as recited in claim 1, wherein a depth of insert assembly controls a biasing force exerted on said piston.

7. The assembly as recited in claim 1, wherein said insert comprises a deformable material.

8. The assembly as recited in claim 1, wherein said insert comprises a plastic material.

9. The assembly as recited in claim 1, wherein said insert comprises Delron.

10. The assembly as recited in claim 1, wherein said insert comprises an opening.

11. The assembly as recited in claim 1, comprising a sealing surface surrounding said opening and a seal disposed between said piston and said sealing surface.

12. A gas cylinder assembly comprising:
a cylinder defining a chamber and an opening; and
a valve mountable to said cylinder comprising a housing defining a first bore comprising an inlet and an outlet, a piston having a pin section extending through said outlet and movable within said bore between an open and closed position, a spring biasing said piston toward said closed position, and an insert securable within said first bore by at least one barb, said spring disposed between said piston and said insert.

13. The assembly as recited in claim 12, wherein said at least one barb is disposed on an internal surface of said bore.

14. The assembly as recited in claim 12, comprising a groove within said bore and said insert includes said at least one barb, wherein said at least one barb engages said groove.

15. The assembly as recited in claim 12, comprising a shoulder for controlling assembly of said insert into said first bore.

16. The assembly as recited in claim 12, wherein a distance between said piston and said insert compresses said spring a desired amount for controlling a biasing force exerted on said piston.

17. The assembly as recited in claim 12, wherein said insert comprises a plastic material.

18. The assembly as recited in claim 12, wherein said insert comprises Delron.

* * * * *